No. 855,445. PATENTED JUNE 4, 1907.
A. DAHLIN.
MANURE AND STRAW GATHERER.
APPLICATION FILED APR. 7, 1906.

WITNESSES:
E. C. Carlsen
L. C. Carlsen

INVENTOR.
August Dahlin.
BY his ATTORNEY.
A.M. Carlsen.

UNITED STATES PATENT OFFICE.

AUGUST DAHLIN, OF STOCKHOLM, WISCONSIN.

MANURE AND STRAW GATHERER.

No. 855,445.      Specification of Letters Patent.      Patented June 4, 1907.

Application filed April 7, 1906. Serial No. 310,555.

*To all whom it may concern:*

Be it known that I, AUGUST DAHLIN, a citizen of the United States, residing at Stockholm, in the county of Pepin and State of Wisconsin, have invented certain new and useful Improvements in Manure and Straw Gatherers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to devices for gathering manure and straw from around the straw stacks where farmers usually let the cattle feed as they please, with the result that much straw is spilled and trampled down into the manure accumulating about the stack. Such mixed accumulation is only fit for use as fertilizer after it has been piled away for some time with lime or other ingredients added, not here to be described, to make a composition. Heretofore the straw and manure have been shoveled into wagons and shoveled out again into the pile of compost.

The principal object of my invention is to save the labor of such shoveling, hauling and shoveling again. This object I attain by the novel construction and arrangement of parts illustrated in the accompanying drawing in which—

Figure 1:
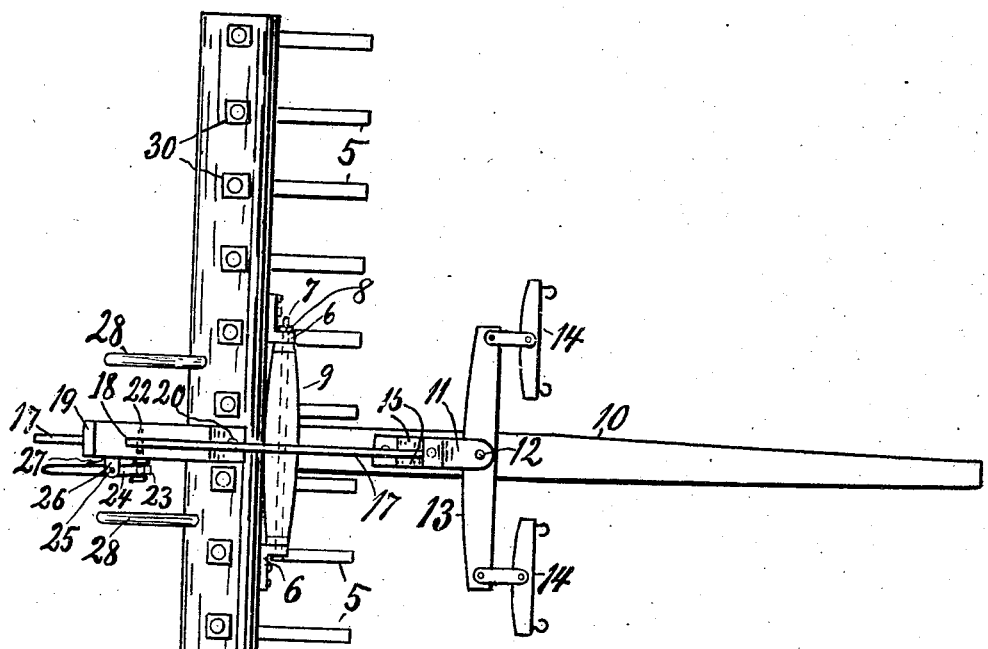
Figure 2:
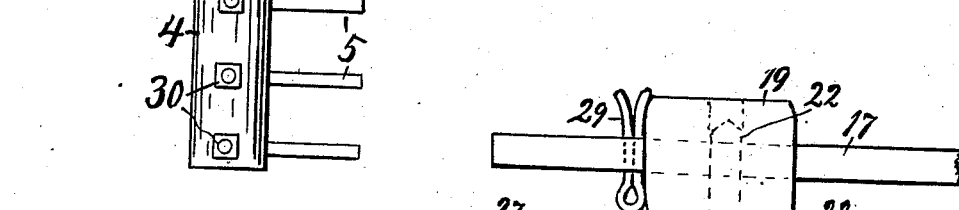
Figure 3:
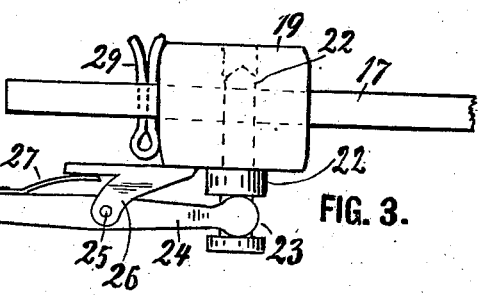

Figure 1 is a top or plan view of my manure and straw gatherer. Fig. 2 is a side elevation of Fig. 1 with the swingle-tree and whiffle-trees omitted. Fig. 3 is an enlarged end view of the arm 19 with adjacent parts.

Referring to the drawing by reference numerals 4 is a transverse bar preferably made of a wrought iron pipe though it may be made of wood and be round, square, hexagonal &c. In said bar is fixed a series of curved teeth or tines 5. Near the middle of the bar are secured two brackets 6, in which is inserted a pivot bolt 7, retained by a nut 8, and holding pivotally the cross piece 9 fixed on the rear end of a pole 10. Upon the pole is bolted a bracket 11, whose front end by means of a bolt 12 holds a double-tree 13 and two swingle-trees 14, while the rear end is formed with two lips 15, between which is pivoted at 16 the front end of a flat segmentally-curved brace 17, which slides through a slot 18 in an arm 19 secured by bolts 20 at the middle of the main bar 4. The brace 17 has a series of holes 21 so arranged that when one hole is close to the rear side of the arm 19, an other of the holes is in position to receive the end of a pin 22 sliding in the arm and adapted to lock the arm 19 and the brace 17 together. Said pin 22 has a recess 23, in which engages a lever 24 fulcrumed at 25 to a projection 26 of the arm 19 and is held by the spring 27 with the pin 22 normally pushed forward into the arm. 28 are arms or handles fixed into the bar 4, one at each side of the arm 19. 29 is a cotter pin movable into any hole desired in the brace 17.

In the operation of the device the animals are hitched to the swingle-trees 14, and drawing the machine over the ground the manure or straw-mixed manure, as the case may be, is gathered into a row in front of and moved by the tines 5 until the charge is suitably large, when it is hauled upon or at least to the heap of compost, the lever 24 is then used to withdraw the pin 22 from the brace 17, and as the horses advance farther the arm 19 folds forward upon the bracket 15 and the tines 5 assume the position 5$^\times$ in Fig. 2, and pass over the load. Having returned for the next load the driver takes hold of either one of the handles 28 with one hand, and of the lever 24 with the other hand, and turns the bar 4 and its tines into operative position and let go of the lever 24 so that the pin 22 will interlock with the brace 17. To enable the operator to know what time the pin is at the right hole in the brace so as to hold the tines 5 at the proper slant for soft and hard ground, the cotter pin 29 is placed in a hole where it will stop the rearward swinging of the arm 19 at a point giving the tines the proper incline; the tines being supposed to form runners upon the ground and at the same time to have their points or ends pass so close to the ground as to gather up or take along every-thing found loose before them.

While I have shown the complete machine, as it will perhaps mostly go on the market in that form, it is proper to state that the brackets 6 are placed such a distance apart that the ordinary pole that farmers use on their bob-sleds may be applied and the bracket 11 secured upon it, so that farmers who so wish may buy the machine with the brace 17 and bracket 11 but leave out the pole 9—10, and use the pole of the bob-sled. The tines 5 I have shown as secured by nuts 30—31, but it is obvious that the nut 31 may be a forged collar; and that the tines may be secured by many other means than by nuts.

Having thus described my invention, what I claim, and desire to secure by Letters Patent, is:—

1. A device of the class described, comprising a transverse frame or body bar with a series of inclined tines projecting normally downwardly and forwardly therefrom, the arm 19 fixed at the middle of the bar and having a slot or hole in it, a T-shaped pole having its cross-head at the rear end and pivotally secured to the front side of the body bar, a brace pivotally secured to the pole and passing through the slot in the arm 19, and means for locking the brace in said arm in an easily detachable manner.

2. A device of the class described, comprising a transverse frame or body bar with a series of inclined tines projecting normally downwardly and forwardly therefrom, the arm 19 fixed at the middle of the bar and having a slot or hole in it, a T-shaped pole having its crosshead at the rear end and pivotally secured to the front side of the body bar, a brace pivotally secured to the pole and passing through the slot in the arm 19, and means for locking the brace in said arm in an easily detachable manner, said locking means consisting of a pin sliding in the arm and adapted to enter holes in the brace, a spring-pressed lever pivoted to the arm and operating said pin, said brace having holes to receive the pin.

3. A device of the class described, comprising a transverse frame or body bar with a series of inclined tines projecting normally downwardly and forwardly therefrom, the arm 19 fixed at the middle of the bar and having a slot or hole in it, a T-shaped pole having its crosshead at the rear end and pivotally secured to the front side of the body bar, a brace pivotally secured to the pole and passing through the slot in the arm 19, and means for locking the brace in said arm in an easily detachable manner, said locking means consisting of a pin sliding in the arm and adapted to enter holes in the brace, a spring-pressed lever pivoted to the arm and operating said pin, said brace having holes to receive the pin, and means for stopping the arm 17 in different predetermined places on the brace.

4. A device of the class described, comprising a transverse frame or body bar with a series of inclined tines projecting normally downwardly and forwardly therefrom, the arm 19 fixed at the middle of the bar and having a slot or hole in it, a T-shaped pole having its crosshead at the rear end and pivotally secured to the front side of the body bar, a brace pivotally secured to the pole and passing through the slot in the arm 19, and means for locking the brace in said arm in an easily detachable manner, said tines being curved so as to form runner-like bearings on the ground near their ends.

5. A device of the class described, comprising a transverse frame or body bar with a series of inclined tines projecting normally downwardly and forwardly therefrom, the arm 19 fixed at the middle of the bar and having a slot or hole in it, a T-shaped pole having its crosshead at the rear end and pivotally secured to the front side of the body bar, a brace passing through the slot in the arm 19, and means for locking the brace in said arm in an easily detachable manner, a bracket secured upon the pole and having lugs pivoted to said brace and a goose-neck at its front end with a bolt therein for holding a double-tree.

6. A device of the class described, comprising a transverse frame or body bar with a series of inclined tines projecting normally downwardly and forwardly therefrom, the arm 19 fixed at the middle of the bar and having a slot or hole in it, a T-shaped pole having its crosshead at the rear end and pivotally secured to the front side of the body bar, a brace passing through the slot in the arm 19, and means for locking the brace in said arm in an easily detachable manner, a bracket secured upon the pole and having lugs pivoted to said brace and a goose-neck at its front end, a bolt therein for holding a double-tree, said bracket on the pole being detachably bolted thereto, two brackets on the body bar, a bolt passed therethrough and through said rear end of the pole whereby it is made detachable from the body bar; the distance between said brackets being such that the standard size of transverse heads at the rear end of poles of an ordinary bob-sled will fit between the brackets, substantially as and for the purpose set forth.

7. A device of the class described, comprising a transverse body bar with a series of inclined tines projecting downwardly and forwardly therefrom, a radial arm at the middle of the bar, the same having a hole or slot transversely through it, a T-shaped pole having its crosshead at the rear end and pivotally secured at the front side of the body bar, an arched brace passing through said hole in the arm and being secured to the pole, a locking mechanism carried by the arm and adapted to engage the brace, and one or more handles on the body bar to turn it into locking position.

In testimony whereof I affix my signature, in presence of two witnesses.

AUGUST DAHLIN.

Witnesses:
 FREDOLPH PETERSON,
 ELMER CARDELL.